COMPENSATING CIRCUIT FOR DELAY LINE

Filed Dec. 3, 1962 2 Sheets-Sheet 1

INVENTORS
JAMES J. KENNEDY
JAMES C. ROGERS
BY Leo J. Aubel
ATTORNEY 3,165,721
COMPENSATING CIRCUIT FOR DELAY LINE
James J. Kennedy and James C. Rogers, Endicott, N.Y., assignors to International Business Machines Corporation, New York, N.Y., a corporation of New York
Filed Dec. 3, 1962, Ser. No. 241,893
6 Claims. (Cl. 340—173)

This invention relates to a circuit for a delay line and more particularly to a circuit which compensates for variations in the delay of pulses being propagated through a delay line, which variations are due to changes in the delay imparted to a pulse by the delay line itself and by the associated circuits.

As is known, pulses propagated through a delay line are delayed for a time dependent principally on the length of the delay line. However, in practical applications, it has been found that the delay in a delay line system may vary somewhat. The variation of the delay imparted to a pulse being recirculated in a delay line system has two principal components; first, the variation in the delay effected by the delay line itself due to temperature and humidity changes, and second, the variation due to instantaneous changes in the electronic circuits included in the pulse regeneration loop and frequency drift of the applied synchronizing or clock pulses. This variation of delay of the pulse is termed as the "skew" of the pulse or "pulse skew".

Although the pulse skew is relatively much less than the total delay of the length line, a serious problem arises if a train of pulses of intelligible information is being sent down a delay line and these pulses are to be recirculated in the delay line. The pulse skew may cause the phase of the pulses being recirculated to be shifted, such that after the pulses are recirculated in the delay line a number of times, the position of the pulses may be changed due to this phase shift and thus cause the intelligible information to be distorted.

Heretofore, in cases where a train of pulses is propagated through a delay line, which pulses are representative of intelligible information and which pulses must be recirculated within the delay line, it has been necessary to provide means, such as temperature regulating ovens, for controlling the temperature variations of the delay line and thus controlling the pulse skew.

The circuitry of the present invention compensates for variations in the skew of the pulses as they are propagated down the delay line such that each pulse is received at the output of the delay line and is re-entered or reinserted into the delay line in exactly the same position into which they entered the delay line initially; and, circuitry assures that each pulse retains its initial width or time duration.

Accordingly, it is a principal object of the present invention to provide a circuit for compensating for any variations in the delay of pulses being propagated through a delay line.

It is another object of the present invention to provide a circuit for compensating for variations in the delay of pulses being propagated through a delay line due to the pulse skew.

It is another object of the present invention to provide a control circuit for a delay line for providing a given delay in the delay line system independent of the pulse skew.

It is another object of the present invention to provide a delay line which tolerates variations of a pulse phase shift, skew or delay as much as 90% of the pulse bit period.

It is another object of the present invention to provide a delay line system which is less subject to temperature, humidity and other variations.

In the attainment of the foregoing objects, we provide a compensating circuit for a delay line in which the pulse output of the delay line is amplitude detected and coupled to a pair of bistable circuits in which the edge of the pulse output of the first bistable circuit, which is controlled by a clock pulse is utilized to trigger the second bistable circuit to provide a pulse to the input of the delay line and the width of this latter pulse is determined by a given clock period whereby a pulse of a preset width and positioned in a relative same position is provided in response to a pulse output received from said delay line.

The foregoing and other objects, features and advantages of the invention will be apparent from the following more particular description of preferred embodiments of the invention, as illustrated in the accompanying drawings.

Figure 3B:
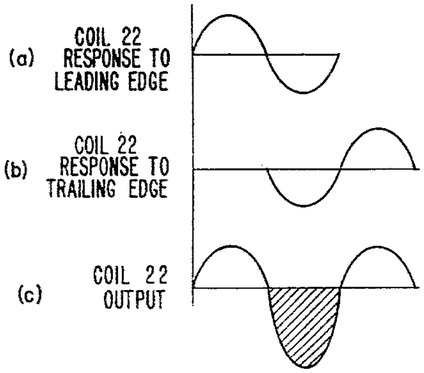
Figure 3A:
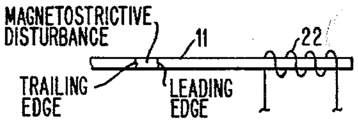
Figure 4:
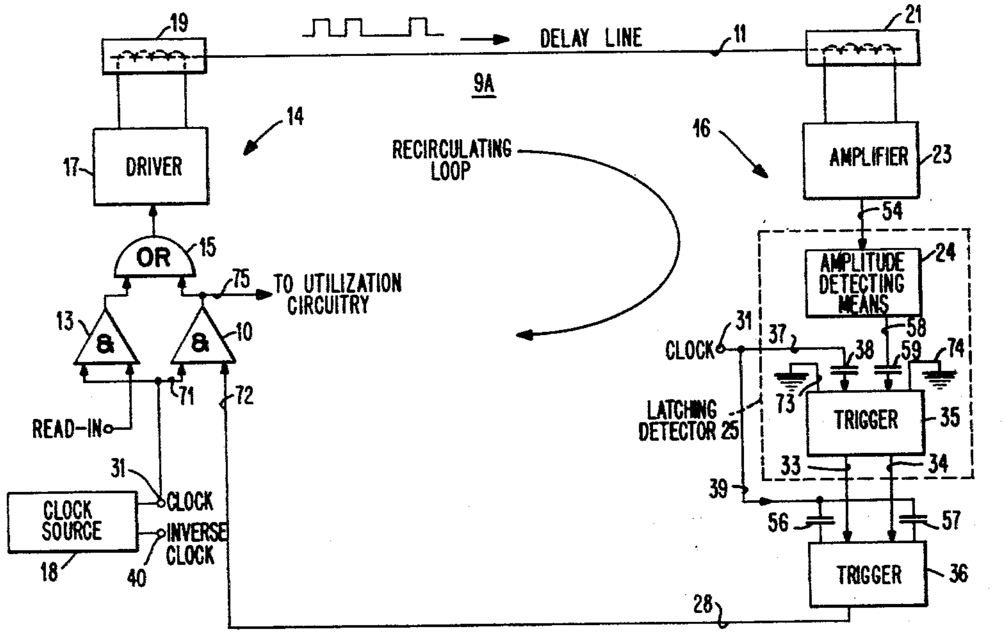
Figure 5:
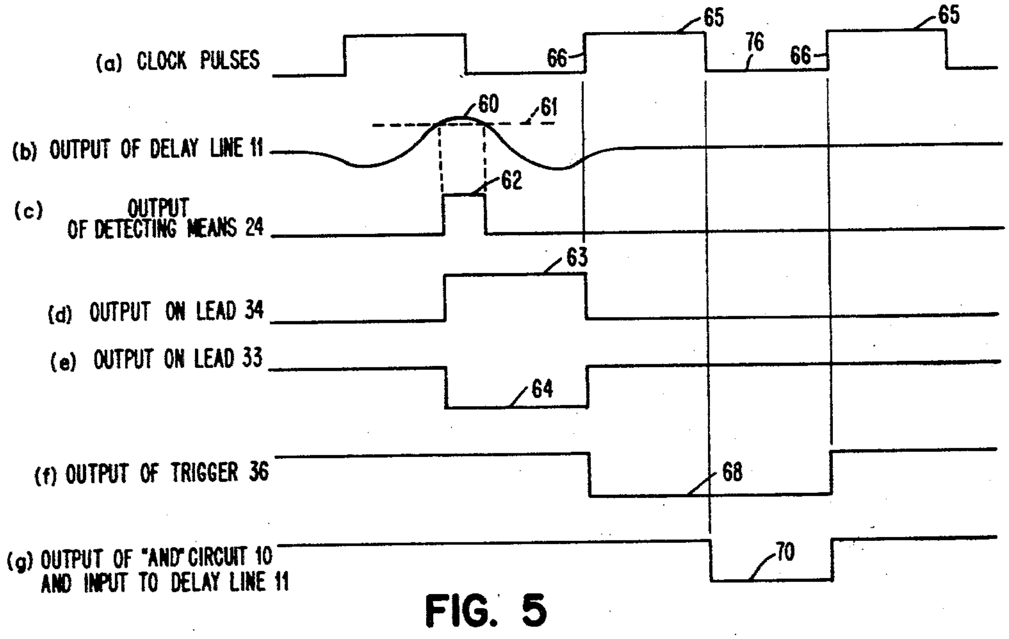

FIGS. 3*a* and 3*b* show the waveform formed by a pulse coupled to and out of the delay line;

FIG. 4 shows, in block diagram form, a second embodiment of a circuit in accordance with the invention;

FIG. 5 shows some waveforms useful in explaining the operation of the circuit of FIG. 4.

Figure 1:
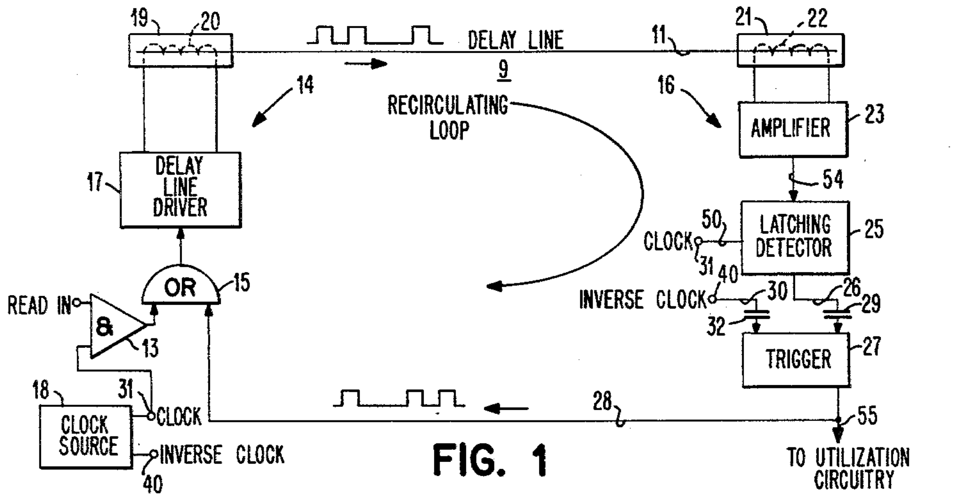
FIG. 1 shows, in block diagram form, a circuit in accordance with the invention for compensating for variations in the delay of the delay line.

A delay line circuit 9 in accordance with the invention is shown in block diagram form in FIG. 1. A delay line 11 which, as is known, imparts a given time delay to pulses being propagated therethrough, is provided with input and output circuitry labeled 14 and 16 respectively. The input circuitry 14 is utilized to read in data pulses representing intelligible information into the delay line 11; the data pulses propagate through the delay line 11 and are read out by the output circuitry 16 to be recirculated in the delay line 11 or coupled to utilization circuitry, not shown, as will be explained hereinbelow.

To perform a read-in operation, that is, to insert a pulse in delay line 11, a read-in signal from any suitable signal source as in a computer, not shown, is coupled through an AND circuit 13 and an OR circuit 15 to the delay line driver 17. A signal from a clock source 18, of any suitable known type, providing equal Positive-Negative, that is, clock and inverse clock timing pulses or signals, is also coupled from terminal 31 to AND circuit 13. When there is coincidence between the pulse from the clock source and the read-in signal input, AND circuit 13 is conditioned or enabled to pass a signal to OR circuit 15 and thence to the delay line driver 17, which driver provides a signal to a transducer 19 positioned at the input end of delay line 11 (the left hand end of delay line 11 as oriented in FIG. 1). The AND circuit 13, the OR circuit 15, thedriver 17, and the transducer 19 may all be of any suitable types known in the art. An example of an improved transducer 19 which may be used in the present circuit is shown in the patent application Serial No. 192,894 of N. S. Tzannes, et al., entitled Delay Line Transducer, which application is assigned to the same assignee as the present invention. Transducer 19 converts the electrical signal pulse received from driver 17 to a magnetostrictive disturbance (stress wave), that is, an acoustical pulse. The acoustical pulse is then propagated through the length of the delay line 11 to the other or opposite end of the delay line 11 (the right hand end as oriented in FIG. 1). When the acoustical pulse reaches the output end of the delay line 11 a second transducer 21, identical to transducer 19, senses the acoustical pulse in the delay line and converts this acoustical pulse into an electrical signal or pulse as is well known in the art. Transducers 19 and 21 are shown as including coils 20 and 22 respectively; specifically, coils 20 and 22 are shown for purposes of explaining hereinbelow the waveform obtained from delay line 11.

The shape of the signal pulse 43 shown by the solid line waveform in line (*d*) of FIG. 2 will be explained by reference to FIGS. 3*a* and 3*b*.

Assume that transducer 19 converts an electrically positive pulse to a magnetostrictive disturbance in delay line 11. FIG. 3*a* indicates the leading and trailing edges of the magnetostrictive disturbances caused by the pulse applied to the input end of the delay line 11. When the leading edge of the magnetostrictive disturbance enters the coil 22 of transducer 21, it provides a voltage pulse indicated as the (+) positive portion of the waveform in line (*a*) of FIG. 3*b*. When the leading edge of the magnetostrictive disturbance exits or passes out of the coil 22, it produces a signal pulse indicated by the (−) negative portion of the waveform shown in line (*a*) of FIG. 3*b*. When the trailing edge of the disturbance enters coil 22, it provides a signal indicated as the (−) negative portion of the waveform in line (*b*) of FIG. 3*b*; and when the trailing edge of the disturbance exits from the coil 22, it produces a signal pulse indicated by the (+) positive portion of the waveform shown in line (*b*) of FIG. 3*b*. The coil 20 in transducer 19 and the coil 22 in transducer 21 are positioned and are geometrically arranged such that voltage signals developed in the coil 22 by the leading and trailing edges of the magnetostrictive disturbance are additive such as to produce the resultant waveform shown in line (*c*) of FIG. 3*b*.

The central or negative portion of the waveform indicated by the cross-hatched line, line (*c*) of FIG. 3*b*, indicates or is representative of the pulse applied to the input end of the delay 11, and it is this portion which is detected, reshaped and recirculated in the delay line.

Note that the polarity of the signal pulse 43 would be reversed if the polarity of the electrical pulse applied through transducer 19 to the delay line 11 were changed.

As indicated above, the total delay of the acoustical pulse being propagated through the delay line 11 is principally a function of the length of the delay line. The output electrical signal pulse developed by transducer 21 is coupled to an amplifier 23, which amplifier may be of any suitable type known in the art; the output signal from amplifier 23 is coupled through a latching or bistable detector circuit designated as latching detector 25 which, when activated to one conducting condition, remains in that condition until it is activated to the other conducting condition. Latching detector 25 may be a circuit of the type shown in U.S. Patent 3,003,070 to L. R. Harper, entitled "Transistor Switching Circuits Including An Inverter Stage Driving An Emitter-Follower Stage," which patent is assigned to the same assignee as the present invention. The output signal from the latching detector 25 is coupled to a trigger 27, which then provides an output pulse which is coupled through lead 28 back to OR circuit 15, driver 17 and transducer 19, whence the electrical pulse is converted to an acoustical pulse and again caused to be recirculated or regenerated in the line 11; also, the output pulse may be coupled through lead 55 to utilization circuitry, not shown. The trigger 27 may also be a circuit of the type shown in the above-cited Patent 3,003,070. Thus, latching detector 25 and trigger 27 are both bistable state circuits; that is, both circuits have two stable conducting conditions. In the description of the invention, the functions of the two circuits are designated by the nomenclature, i.e., one bistable circuit functions as a latching detector 25 and the other bistable circuit functions as a trigger 27, as will be explained hereinbelow.

The latching detector 25 is arranged to be turned on, that is, to shift to an initial conducting condition by a clock pulse provided by clock source 18 through terminal 31 and line 50. Note that the terminals from clock source 18 providing the clock pulses and inverse clock pulses are shown and labeled as 31 and 40 respectively in two places in the drawing for the purpose of keeping the drawings uncluttered. The latching detector 25 will be shifted to its second conducting condition by a signal pulse received from the delay line 11 through lead 54 (via transducer 21 and amplifier 23). Likewise, the trigger 27 is arranged to shift to an initial conducting condition by an inverse clock pulse from clock source 18 coupled through terminal 40, lead 30 and capacitor 32 to trigger 27. The trigger 27 will be shifted to its second conducting condition by the signal received from latching detector 25 through lead 26 and capacitor 29.

The operation of the circuit of FIG. 1 is as follows. Refer now to both FIGS. 1 and 2; when a signal pulse 43 from delay line 11 coupled to latching detector 25 (via transducer 21 and amplifier 23) through lead 54 exceeds an established or given threshold level, indicated as numeral 44 on line (*d*) FIG. 2, the latching detector 25 will be caused to shift conducting conditions. The threshold level of latching detector 25 is empirically preset by selecting suitable bias potentials, as is well known in the art. Assume that the signal pulse 43 is as indicated by the solid line waveform in line (*d*) of FIG. 2; the latching detector 25 will shift from an initial to a second conducting condition at the point where the amplitude of the signal pulse exceeds the threshold level 44; this point is indicated by the leading edge 42 of pulse 47 in line (*e*) of FIG. 2. Next, the leading positive-going edge 45, line (*a*) of FIG. 2, of the succeeding clock pulse 46 applied through lead 50 to the other input of latching detector 25, see FIG. 1, resets or shifts the latching detector 25 to its initial conducting condition. The resetting of the latching detector 25 causes a signal to be provided by latching detector 25 through lead 26 and capacitor 29 to shift trigger 27 from an initial to a second conducting condition. The trigger 27, when shifted to its second conducting condition, will provide a positive output pulse 48, line (*f*) FIG. 2, through lead 28, the OR circuit 15 and the driver 17 to the delay line 11; and also through lead 55 to the utilization circuitry, not shown. The output pulse 48 will be terminated, line (*f*) FIG. 2, when the trigger 27 is reset to its initial conducting condition by the leading positive-going edge 51, line (*b*) FIG. 2, of the succeeding inverse clock pulse 49 coupled through lead 30 and capacitor 32 to trigger 27. The width or time duration of the pulse 48 provided by trigger 27 is thus controlled to be the width of a half cycle of the clock pulses.

Figure 2:
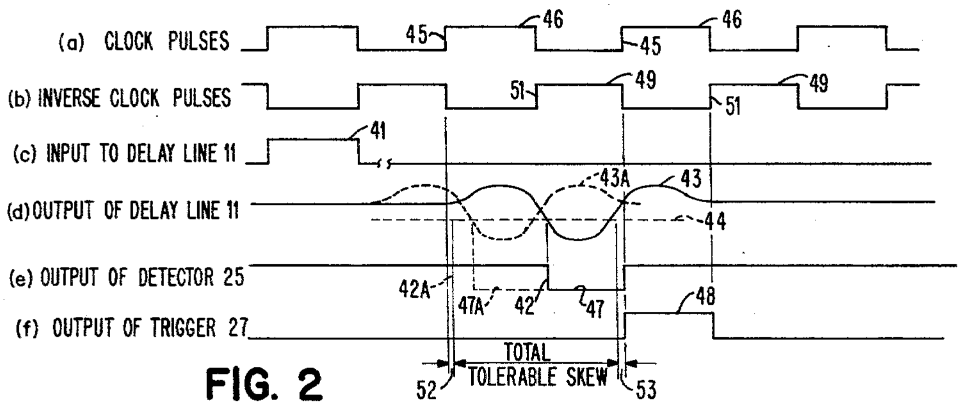
FIG. 2 shows some waveforms useful in explaining the operation of the circuit of FIG. 1.

Next, assume that because of temperature variations, the same signal pulse 43 from delay line 11 has been skewed to the position indicated by the dotted signal pulse 43A of line (*d*) of FIG. 2. When the signal pulse 43A exceeds the threshold level 44 the latching detector 25 will shift to its second conducting condition; this is indicated by the leading edge 42A of pulse 47A in line (*e*) of FIG. 2. The latching detector 25 will remain in its second conducting condition until it is reset by the leading or positive-going edge 45, line (*a*) FIG. 2, of the succeeding clock pulse 46 at which time the latching detector 25 will couple a signal through lead 26 and capacitor 29 to shift trigger 27 to its second conducting condition. Trigger 27 will provide a positive output pulse 48, line (*f*) FIG. 2, through lead 28, the OR circuit 15, driver 17 and transducer 19 to the delay line 11; and also through lead 55 to the utilization circuitry, not shown. The pulse 48 will be terminated, line (*f*) FIG. 2, when the trigger 27 is reset to its initial conducting condition by the leading positive-going edge 51, line (*b*) FIG. 2, of the succeeding inverse clock pulse 49 one half cycle later.

It will be readily appreciated that the circuits of FIG. 1 and the corresponding waveforms of FIG. 2 are shown as providing a positive output pulse 48 to delay line 11;

the output pulse could likewise be arranged to be of a negative polarity merely by making known and straightforward modifications to the circuitry of FIG. 1.

In essence, the circuitry of FIG. 1 is arranged to respond to a signal pulse 43 from the delay line 11, which will activate the latching detector 25 to subsequently provide a signal to switch the trigger 27 synchronous with the succeeding leading edge of a clock pulse regardless of the skew of the pulse; and the pulse is then terminated by the leading edge of the succeeding inverse clock pulse. Thus, even though the signal pulse 43 may have skewed, as indicated in FIG. 2, an output pulse of uniform width is provided by trigger 27 for re-insertion into the delay line 11; and the output pulse 48 provided by trigger 27 is positioned in a same identical position each time it is recirculated.

Total permissible skew of the signal pulse 43 is indicated in line (*d*) of FIG. 2 and by the extended dimension lines in FIG. 2. It should be emphasized that, theoretically, the signal pulse 43 can be detected from the leading edge 45 of a clock pulse 46 which resets the latching detector 25 to the corresponding leading edge 51 of a succeeding clock pulse; that is, theoretically, the skew can be a full clock cycle. However, because of the inertia of the various circuits in the output circuitry 16, the periods of time indicated by the numerals 52 and 53, shown exaggerated on lines (*d*), (*e*) and (*f*) are necessary to permit proper activation and de-activation of the associated circuits including the latching detector 25; and thus, the periods of time indicated by numerals 52 and 53 are, in effect, dead times. It has been found that a pulse skew of about 90% of a clock cycle is tolerable. Thus, the circuit according to the invention will still provide an output pulse for re-insertion into and recirculating in the delay line 11 which is of uniform width and which is positioned in the same relative position at which it was initially inserted into the delay line even if there is considerable change in the relative position of a pulse being recirculated in the delay line 11.

A second embodiment according to the invention is shown in FIG. 4. The circuit 9A of FIG. 4 is similar to the circuit 9 of FIG. 1; like characters in the two figures indicate like elements. Again the basic feature is that a bistable trigger 36 or bistable device is set by another bistable device (the latched detector 25), and the bistable trigger 36 is reset by the clock pulses to provide pulses of uniform width positioned in their same relative relation.

The output circuitry 16 shown in FIG. 4 includes an amplitude detecting or gating circuit means 24 of any suitable type known in the art, and a bistable trigger 35. The amplitude detecting circuit means and the trigger 35 may be considered as one unit (as indicated by the dotted lines on FIG. 4) which functions the same as the latching detector 25 of FIG. 1. The output of the amplitude detecting circuit means 24 is coupled through lead 58 and capacitor 59 as one input to the trigger 35. A second input to trigger 35 is a clock pulse coupled through lead 37 and capacitor 38. Two output signals from trigger 35 are coupled through leads 33 and 34 to a second trigger 36.

Triggers 35 and 36 are preferably of the type shown in U.S. Patent No. 3,003,070, supra (note FIG. 2 thereof); that is, the triggers 35 and 36 are shifted from one to the other conducting condition; i.e., set and reset by an alternating current input voltage and direct current voltages are superimposed on or gate the alternating current input voltages. For example, the alternating current input voltages to trigger 35 are applied through leads 37 and 58, and the alternating current input voltages to trigger 36 are applied through lead 39 and capacitors 56 and 57 connected in parallel. The direct current or gating voltages are applied to trigger 35 through leads 73 and 74 and the direct current or gating voltages are applied to trigger 36 through leads 33 and 34.

In trigger 35, the reference potential on lead 74 functions as the gating voltage for the pulses applied to trigger 35 through lead 58 and capacitor 59; likewise, the reference potential on lead 73 functions as the gating voltage for the pulses applied to trigger 35 through lead 37 and capacitor 38. In trigger 36, the voltage on lead 34 functions as the gating voltage for the pulses applied to trigger 36 through lead 39 and capacitor 57; likewise, the voltage on lead 33 functions as the gating voltage for the pulses applied to trigger 36 through lead 39 and capacitor 56.

The gating voltages for trigger 35 are adjusted to a given reference as by connecting leads 73 and 74 of trigger 35 to ground reference through appropriate impedances, not shown, such that trigger 35 will respond to alternating current signals from the clock 31 or the detector 24. The gating voltages or gates coupled to trigger 36 through leads 33 and 34 are under the control of trigger 35 for purposes to be explained hereinbelow.

The operation of the circuit 9A of FIG. 4 will be explained by reference to the waveforms of FIG. 5, and it will be readily appreciated that the circuits of FIGS. 1 and 4 operate similarly.

Note that in this embodiment, the circuit 9A is arranged to handle a positive signal pulse 60 from the delay line 11; however, as indicated above, the circuit 9A could likewise be arranged to handle signal pulses of negative polarity by straight-forward modification of the circuitry.

Initially, the clock pulses 65 from source 18 coupled through lead 37 and capacitor 38 to trigger 35, and through lead 39 and capacitors 56 and 57 in parallel to trigger 36 cause triggers 35 and 36 to be in an initial or first stable conducting condition. When the signal pulse 60 from the delay line 11, which is coupled through amplifier 23 and lead 54 to amplitude detecting means 24, exceeds a preset threshold level, indicated by the dotted line 61 in line (*b*) of FIG. 5, a signal 62 will be developed by the amplitude detecting circuit means 24.

The signal 62 coupled through lead 58 and capacitor 59 to trigger 35 causes trigger 35 to shift to its second conducting condition; when trigger 35 shifts to its second conducting condition, it provides a positive pulse 63 through lead 34 to trigger 36; and also, a negative pulse 64 through lead 33 to trigger 36. The positive pulse 63 coupled through lead 34 to trigger 36 functions as a gating voltage for the clock pulse 65 applied through lead 39 and capacitor 57 to trigger 36; the positive pulse 63 thus enables the positive-going edge 66, line (*a*) FIG. 5, of the clock pulse 65 to cause trigger 36 to shift to its second conducting condition. The negative pulse 64 "gates-out" or prevents the clock pulse 65, coupled through capacitor 56, from affecting trigger 36. When trigger 36 is in its second conducting condition it provides a negative pulse 68, line (*f*) FIG. 5, through lead 28 to input terminal 72 of AND circuit 10.

Trigger 36 latches or remains in its second conducting condition in which it provides a negative pulse 68. The pulses 63 and 64, lines (*d*) and (*e*) of FIG. 5, will be terminated by the leading positive-going edge 66 of the clock pulse 65, line (*a*) FIG. 5, coupled through lead 37 to trigger 35. Since the gating voltage pulse 64 is terminated, lead 33 is relatively more positive, that is, "up," line (*e*) FIG. 5, this functions as a gating voltage for the clock pulse 65 applied through lead 39 and capacitor 56 to trigger 36. This causes the positive-going edge 66 of the succeeding clock pulse 65 (coupled through lead 39 and capacitor 56) to shift trigger 36 to its "initial" conducting condition. When trigger 36 shifts to its initial condition, the pulse 68 is terminated.

As discussed above with reference to FIG. 2, the signal pulse 60 may skew as much as 90% of the total clock cycle and the output pulse 68 will still be maintained in its same width and in the same relative position.

The AND circuit 10 is enabled or rendered conductive to pass signals only by the coincident application of an inverse clock pulse 76, line (*a*) FIG. 5, to its input 72. Thus, in effect, the output pulse 68 is divided to be equal to one half of a clock cycle to be coupled to the OR circuit 15 and driver 17 to be recirculated in the delay line 11; and/or to be coupled to utilization circuitry, not shown, through lead 75. The trigger 36 is arranged to provide an output pulse 68 having a width equal to a full clock period for the purpose of permitting the use of circuits in the output circuitry 16, which have wider (more flexible) circuit tolerances.

It is entirely optional whether a pulse of a full or a half clock period duration is developed by trigger 36, but in either case the beginning and end of the pulse is fixed relative to the clock as described above. For example, in the circuit of FIG. 4, by merely applying an inverse clock pulse through capacitor 56 as an alternating current input to trigger 36 (instead of, as shown, applying a positive clock pulse through lead 39 and both capacitors 56 and 57 in parallel as alternating current inputs to trigger 36) a pulse of half period duration would be obtained which could be coupled directly to the OR circuit 15 and hence to driver 17 for further recirculation in the delay line 11.

While the invention has been particularly shown and described with reference to preferred embodiments thereof, it will be understood by those skilled in the art that the foreging and other changes in form and details may be made without departing from the spirit and scope of the invention.

What is claimed is:

1. A circuit for compensating for the skew of signal pulses being recirculated from the input to the output of a dynamic storage system, comprising, in combination:
(*a*) bistable state detecting means arranged to respond to signal pulses which exceed a theshold level;
(*b*) means for coupling said signal pulses to said detecting means;
(*c*) a bistable state trigger;
(*d*) clock means for providing timing pulses to said detecting means and said triggger;
(*e*) said detecting means being shifted from their first to their second stable state in response to a signal pulse and being shifted from their second to their first state in response to a succeeding timing pulse and thereby providing a control signal;
(*f*) means connecting said control signal to said trigger;
(*g*) said trigger being shifted from its first to its second stable state in response to said control signal to thereby provide a second control signal and said trigger being shifted from its second to its first stable state in response to the next succeeding timing pulse to terminate said second control signal, whereby said trigger provides an output pulse in response to a signal pulse, which output pulse has a time duration determined by said timing pulses and which is positioned in a same relative position even though skew of said signal pulse may have occurred; and
(*h*) means connecting said output pulse from said trigger to the input of said dynamic storage system.

2. A circuit for compensating for the skew of signal pulses being recirculated through a delay line, the combination comprising:
(*a*) bistable state detecting means for detecting signal pulses which exceed a threshold level;
(*b*) means for coupling signal pulses from said delay line to said detecting means;
(*c*) a bistable state trigger;
(*d*) clock means for providing positive timing pulses to said detecting means and negative timing pulses to said trigger;
(*e*) said detecting means being shifted to its first stable state in response to a detected signal pulse and being shifted to its second stable state to provide a control signal in response to a positive timing pulse;
(*f*) means connecting said control signal to said trigger;
(*g*) said trigger being shifted from its first stable state to its second stable state in response to said control signal and then said trigger being shifted to its first stable state in response to a succeeding negative timing pulse whereby said trigger provides an output pulse in response to a detected signal pulse which output pulse is of a uniform time duration determined by said timing pulses; and
(*h*) means for connecting said output pulse from said trigger to be recirculated in said delay line as a signal pulse.

3. A circuit for compensating for the skew of signal pulses being recirculated through a dynamic storage system, the combination comprising:
(*a*) first and second bistable state devices;
(*b*) means for coupling pulses from said dynamic storage system to said first device;
(*c*) clock means for providing timing pulses to said first and second devices;
(*d*) said first device being shifted to its first stable state in response to a signal pulse and being shifted to its second stable state to provide a control signal in response to a timing pulse;
(*e*) means connecting said control signal from said first device to said second device;
(*f*) said second device being shifted from its first stable state to its second stable state in response to said control signal and then said second device being shifted to its first stable state in response to a succeeding timing pulse whereby said second device provides an output pulse in response to a signal pulse which output pulse is of a uniform time duration determined by said timing pulses; and
(*g*) means for connecting said output pulse from said second device to be recirculated in said dynamic storage system as a signal pulse.

4. A circuit for compensating for the skew of pulses being propagated and recirculated through a delay line comprising, in combination:
(*a*) means for converting electrical pulses to acoustical pulses and coupling said acoustical pulses to said delay line for propagation through said delay line;
(*b*) means for receiving said acoustical pulses being propagated through said delay line and converting said acoustical signals to electrical signal pulses;
(*c*) an amplitude detector having two stable conducting conditions;
(*d*) means connecting said electrical signal pulses from said delay line to said detector;
(*e*) a trigger having two stable conducting conditions;
(*f*) clock means for providing positive and negative timing signals;
(*g*) said detector arranged to be shifted to its first conducting condition in response to electrical signal pulses exceeding a given threshold level;
(*h*) means for connecting positive clock signals to said detector for shifting said detector from its first to its second conducting condition to provide a control signal to said trigger circuit;
(*i*) said trigger having two input terminals;
(*j*) means for connecting said control signal from said detector to one of said input terminals for shifting said trigger from its first to its second conducting condition to thereby provide a second control signal to initiate an output pulse;
(*k*) means for connecting negative timing signals to said other input terminals for shifting said trigger from its second to its first conducting condition to terminate said output pulses, whereby said trigger provides an output pulse of a given time duration and positioned in the same relative position in response to an electrical signal pulse received from said delay line; and, (*l*) means for connecting said output pulse from said trigger as an input to said delay line.

5. A circuit for compensating for the skew of pulses being recirculated from an input to the output of a delay line comprising, in combination:

(*a*) first transducer means positioned at the input of said delay line for converting electrical pulses to acoustical pulses and coupling said acoustical pulses to said delay line;

(*b*) electrical drive means arranged to couple electrical pulses to said first transducer means;

(*c*) second transducer means positioned at the output of said delay line for converting said acoustical pulses to electrical signal pulses;

(*d*) a source of clock pulses;

(*e*) amplitude detecting means for detecting said electrical signal pulses and providing a control signal in response thereto;

(*f*) means for coupling said electrical signal pulses from said second transducer means to said detecting means;

(*g*) first and second bistable conducting devices each having an initial and a second stable conducting condition;

(*h*) means for coupling clock pulses to said first and second bistable conducting devices;

(*i*) means for coupling said control signal from said detecting means to cause said first bistable device to shift from its initial to its second conducting condition;

(*j*) said first bistable conducting device being shifted to its initial conducting condition by a clock pulse and thereby providing a second control signal;

(*k*) means for connecting said second control signal from said first bistable device to said second bistable device;

(*l*) said second bistable device being shifted to its second conducting condition by said second control signal for initiating an output pulse and said second bistable conducting device being shifted to its initial conducting condition by a succeeding clock pulse to thereby terminate said output pulse;

(*m*) whereby the time duration of said output pulse is determined by said clock pulses; and, (*n*) means for connecting said output pulse from said second bistable conducting device to said electrical drive means.

6. A circuit for compensating for the skew of signal pulses being recirculated in a dynamic storage stystem, comprising, in combination:

(*a*) amplitude detecting means;

(*b*) means for coupling the signal pulses being recirculated to said detecting means;

(*c*) first and second bistable state triggers;

(*d*) clock means for providing timing pulses to said first and second triggers;

(*e*) said detecting means coupling those signal pulses exceeding a given threshold level to said first trigger;

(*f*) said first trigger being shifted from its first to its second stable state in response to a signal pulse and being shifted to its first stable state in response to a succeeding timing pulse for providing a control signal;

(*g*) means connecting said control signal to said second trigger;

(*h*) said second trigger being shifted from its first to its second stable state in response to said control signal to thereby provide a second control signal and said trigger being shifted from its second to its first stable state in response to the next timing pulse, whereby said trigger provides an output pulse in response to a signal pulse being circulated, which output pulse has a time duration determined by said timing pulses and which is positioned in a same relative position; and, (*i*) means connecting said output pulse from said second trigger to be recirculated in said dynamic storage system as a signal pulse.

No references cited.